US010285040B2

(12) United States Patent
Liu et al.

(10) Patent No.: US 10,285,040 B2
(45) Date of Patent: May 7, 2019

(54) NEIGHBOR AWARENESS NETWORKING—ACCELERATED DISCOVERY

(71) Applicant: Apple Inc., Cupertino, CA (US)

(72) Inventors: Yong Liu, Campbell, CA (US); Christiaan A. Hartman, San Jose, CA (US); Guoqing Li, Cupertino, CA (US); Lawrie Kurian, San Jose, CA (US); Peter N. Heerboth, San Jose, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/605,011

(22) Filed: May 25, 2017

(65) Prior Publication Data
US 2017/0347255 A1 Nov. 30, 2017

Related U.S. Application Data

(60) Provisional application No. 62/342,803, filed on May 27, 2016.

(51) Int. Cl.
*H04W 8/00* (2009.01)
*H04W 4/08* (2009.01)
*H04W 76/10* (2018.01)
*H04W 4/80* (2018.01)
*H04W 84/12* (2009.01)

(52) U.S. Cl.
CPC ............ *H04W 8/005* (2013.01); *H04W 4/08* (2013.01); *H04W 4/80* (2018.02); *H04W 76/10* (2018.02); *H04W 84/12* (2013.01)

(58) Field of Classification Search
CPC ........ H04W 8/005; H04W 4/80; H04W 76/10
USPC .................................................. 455/41.1, 41.2
See application file for complete search history.

(56) References Cited

U.S. PATENT DOCUMENTS

| 9,258,695 | B2 | 2/2016 | Kasslin et al. | |
| 9,391,853 | B2 | 7/2016 | Vandwalle et al. | |
| 2009/0052380 | A1* | 2/2009 | Espelien | H04L 45/306 370/328 |
| 2009/0147702 | A1* | 6/2009 | Buddhikot | H04W 84/18 370/255 |
| 2013/0094366 | A1* | 4/2013 | Lee | H04L 41/14 370/241 |
| 2015/0172901 | A1* | 6/2015 | Kasslin | H04W 8/005 370/328 |
| 2016/0234301 | A1* | 8/2016 | Qi | H04W 8/005 |

(Continued)

*Primary Examiner* — Ayodeji O Ayotunde
(74) *Attorney, Agent, or Firm* — Meyertons Hood Kivlin Kowert & Goetzel, P.C.; Jeffrey C. Hood; Brian E. Moore

(57) ABSTRACT

In some embodiments, one or more wireless stations operate to configure direct communication with neighboring mobile stations, e.g., direct communication between the wireless stations without utilizing an intermediate access point. Embodiments of the disclosure relate to accelerated service discovery between peer devices. In some embodiments, a wireless device may broadcast a probe beacon on one or more discovery channels. The wireless device may then scan the discovery channels for an extended period of time. The wireless device may receive a response from a peer device and transmit further service information to the peer device in an availability window indicated in the response.

20 Claims, 7 Drawing Sheets

(56) References Cited

U.S. PATENT DOCUMENTS

2016/0330635 A1    11/2016  Chhabra et al.
2017/0006117 A1     1/2017  Kafle et al.
2017/0150296 A1*    5/2017  Jung .................. H04L 12/1886
2017/0311341 A1*   10/2017  Patil ........................ H04W 4/06

* cited by examiner

ABOR AWARENESS
NEIGHBOR AWARENESS NETWORKING—ACCELERATED DISCOVERY

PRIORITY DATA

This application claims benefit of priority to U.S. Provisional Application Ser. No. 62/342,803, titled "Neighbor Awareness Networking—Accelerated Discovery", filed May 27, 2016, by Yong Liu, Christiaan A Hartman, Guoqing Li, Lawrie Kurian, Peter N. Heerboth, and Su Khiong Yong, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer wireless stations (e.g., wireless stations configured to communicate with neighboring wireless stations without utilizing an intermediate access point) to perform accelerated service discovery, including aggressive probing and scanning for available services.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to accelerated service discovery between peer devices. In some embodiments, a wireless device may broadcast a probe beacon on one or more discovery channels. The wireless device may then scan the discovery channels for an extended period of time. The wireless device may receive a response from a peer device and transmit further service information to the peer device in an availability window indicated in the response.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
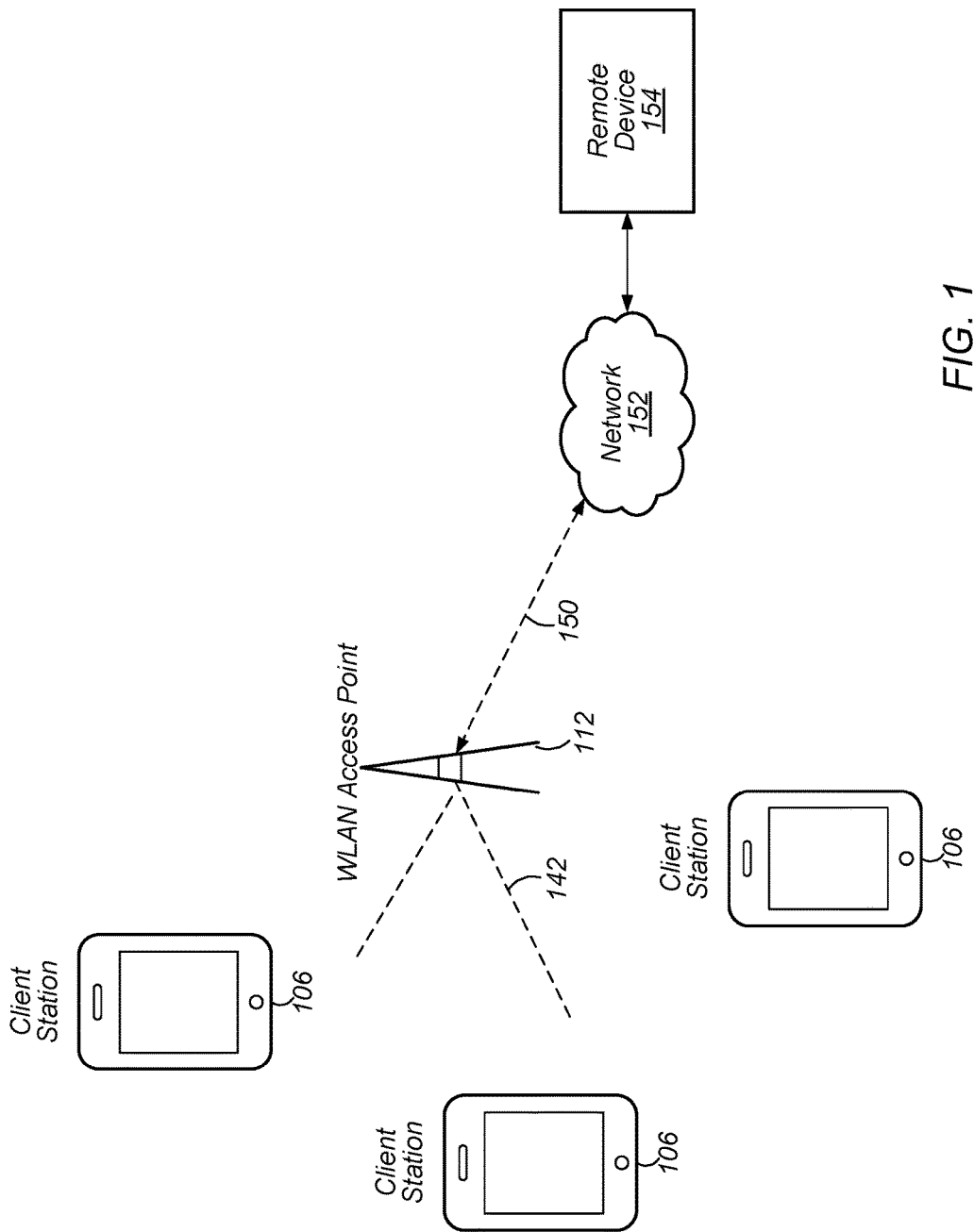
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™ Gameboy Advance™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods for accelerated service discovery, including aggressive probing and/or extended scanning for available services or service matches. In some embodiments, wireless device 106 may broadcast a probe beacon on one or more discovery channels and may then scan the discovery channels for an extended period of time. Wireless device 106 may receive a response from a peer device (e.g., another wireless device 106 and/or an access point 112) and transmit further service information to the peer device in an availability window indicated in the response.

Figure 2:
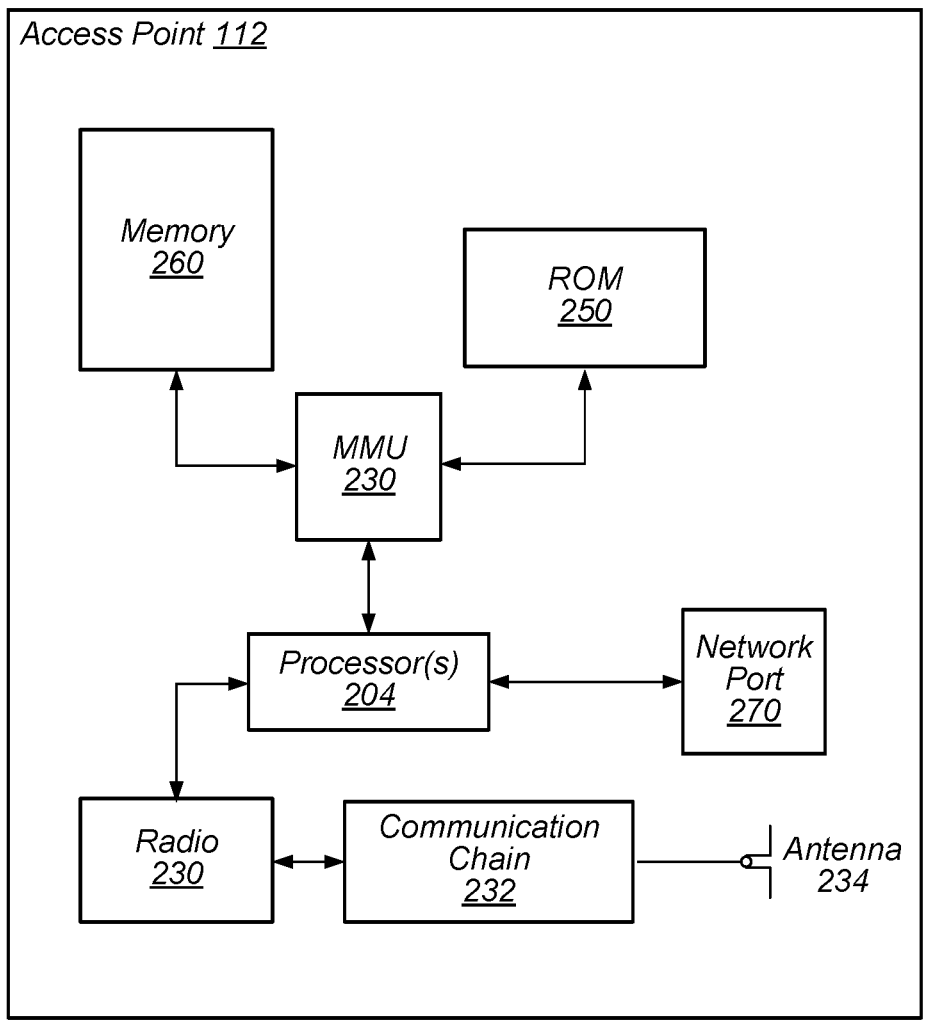
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for accelerated service discovery, including aggressive probing and/or extended scanning for available services or service matches. In some embodiments, AP 112 may broadcast a probe beacon on one or more discovery channels. AP 112 may then scan the discovery channel(s) for an extended period of time and may receive a response from a peer device (e.g., a wireless device, such as wireless device 106) and transmit further service information to the peer device in an availability window indicated in the response.

Figure 3:
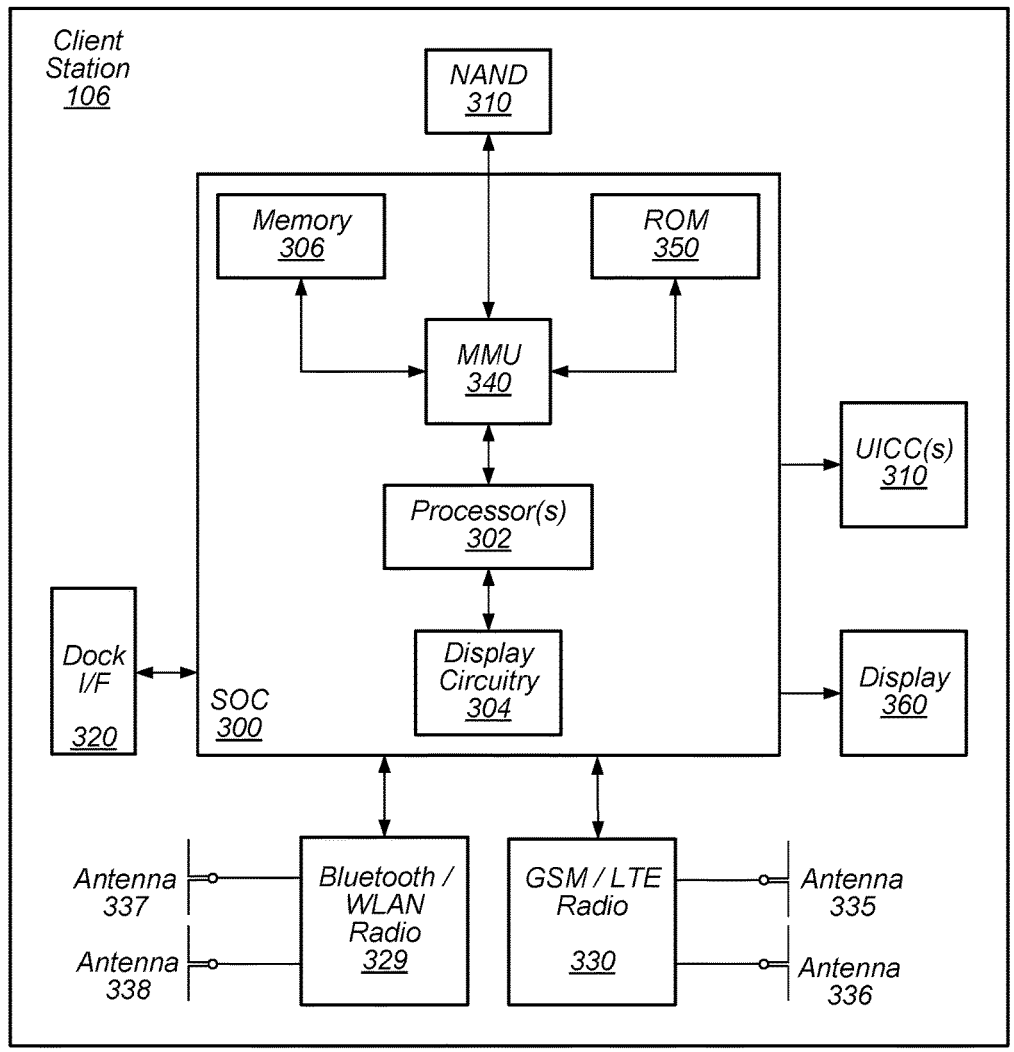
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for accelerated service discovery, including aggressive probing and extended scanning for available services or service matches. In some embodiments, client station 106 may broadcast a probe beacon on one or more discovery channels and may then scan the discovery channels for an extended period of time. Client station 106 may receive a response from a peer device (e.g., another client station 106 and/or an access point 112) and transmit further service information to the peer device in an availability window indicated in the response.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein define methods for accelerated service discovery, including aggressive probing and scanning for available services.

NAN Service Discovery

As described above, NAN 1.0 defines synchronization and discovery. Under NAN 1.0, a master device may transmit synchronization beacons during discovery windows and discovery beacons outside discovery windows, e.g., every 100-200 milliseconds, to facilitate synchronization and discovery. In addition, a non-master sync device may transmit synchronization beacons during discovery windows. However, a non-master non-sync device may not transmit any beacon. Further, an unsolicited publisher and/or an active subscriber may transmit unsolicited service discovery frames during discovery windows whereas a solicited publisher and/or a passive subscriber may not transmit unsolicited service discovery frames.

In addition to facilitation of synchronization and discovery, NAN 1.0 enables all devices (e.g., all NAN devices) in a same neighborhood to eventually merge into a single NAN cluster such that devices within the NAN cluster only need to wake up during the NAN cluster's discovery windows for synchronization and service discovery. However, in most implementations, many factors may prevent NAN devices in a same neighborhood from merging and staying in a single cluster all the time. For example, mobile stations may move in and out of range of other stations (devices) in the single cluster. In addition, low power stations (e.g., mobile stations or other lower power devices), may not turn on (or have on) NAN functionality all the time. As another example, anchor masters may change frequently (for example, due to poor master rank selection), causing the single cluster to break into multiple clusters prior to attempting to reform into the single cluster. Further, interference on NAN channels may lead to a splitting of the single cluster and/or may prevent formation of the single cluster. In some implementations, NAN devices may merge with different NAN clusters individually, without telling other devices in the single cluster and some NAN devices may not merge with the single cluster due to hop count threshold requirements. In addition, NAN devices having active datapaths may not merge with a newly discovered NAN cluster immediately. In other words, NAN devices having active datapaths may choose to preserve the active datapath over merging into the single cluster without the active datapath peer.

Figure 4:
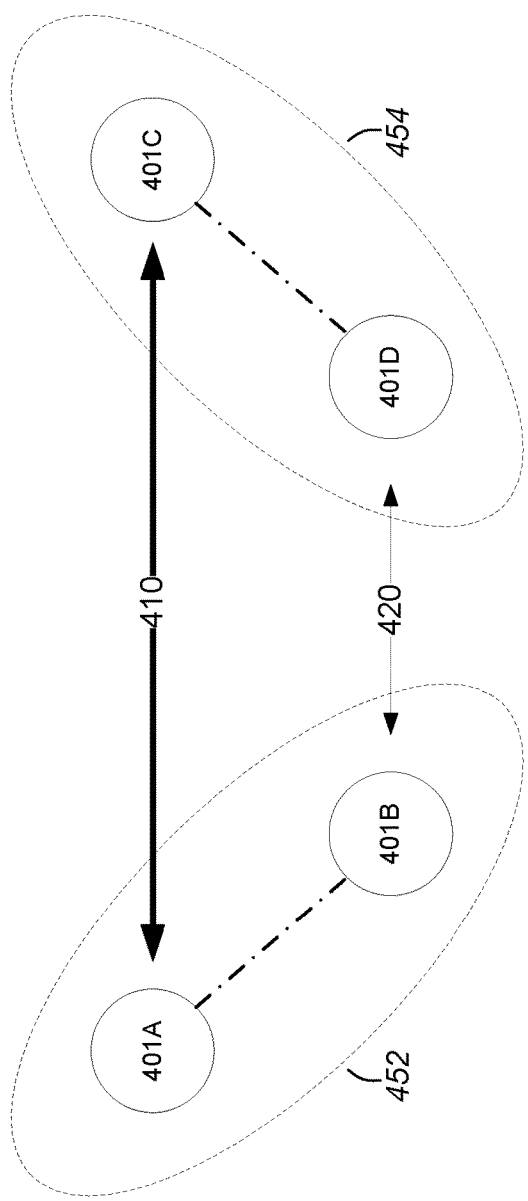
FIG. 4 illustrates an example of NAN device discovery, according to existing implementations.

For example, as FIG. 4 illustrates, NAN devices 401A and 401B may be in a first NAN cluster 452 with an associated first cluster grade, e.g., 100. Similarly, NAN devices 401C and 401D may be in a second NAN cluster 454 with an associated second cluster grade, e.g., 200. Assume that NAN device 401B is a publisher, NAN device 401D is a subscriber, NAN devices 401A and 401C are master devices, and NAN devices 401B and 401D are non-master devices. Thus, under NAN 1.0, NAN devices 401B and 401D may not transmit beacons and may rely on NAN devices 401A and 401C to discovery one another and merge into a common cluster in order to discover one another. However, as discussed above, there may be many factors that may prevent NAN devices 401A and 401C from merging into a common cluster. Thus, if NAN devices 401B and 401D only transmit service discovery frames (SDFs) 420 during respective discovery windows, they may not be able to discover one another unless their discovery windows overlap.

Accelerated Discovery

In some embodiments, to allow NAN devices to discover one another, a NAN device (e.g., a device such as client station 106) may enter a fast (or accelerated/aggressive) discovery mode. In some embodiments, transition to (or enablement of) the fast discovery mode may be responsive to an explicit service/user/device trigger, e.g., a NAN device may receive user input selecting an application/service, and/or an operation occurs on the NAN device (e.g. Screen On, Screen Unlock). In some embodiments, transition to the fast discovery mode (e.g., triggering of the fast discovery mode) may be based on discovery triggering from other interfaces (e.g. Bluetooth (BT), Bluetooth low energy (BTLE), near field communication (NFC), etc.). In some embodiments, a NAN device may enter the fast discovery mode periodically, without explicit triggering, e.g., in order to discover devices/services in a different cluster.

In some embodiments, once a NAN device enters the fast discovery mode, an aggressive probing process and/or an aggressive scanning process may be initiated in addition to standard NAN synchronization and discovery operations. In some embodiments, after a NAN device enters the fast discovery mode, the NAN device may remain in fast discovery mode until discovery of a desired device/service or until a timeout. In some embodiments, a timeout value may be longer for an explicit triggering case and may be shorter for a periodic case.

In some embodiments, after initiation of a fast discovery mode, a NAN device may transmit one or more NAN probe beacons. A NAN probe beacon may include one or more of a device role/state/mode, service information, time/clock information, NAN cluster information, availability schedules, cluster merging indication, and/or device capability information. The device role/state/mode may indicate whether the NAN device has a master/non-master role, is in a sync/non-sync state, and/or is in a fast discovery mode with or without triggering, among other information. The service information may include a list of service identifiers with publisher/subscriber indication, a service identifier hash/bloom filter, and a service descriptor attribute(s), among other information. The time/clock information may include a current timer synchronization function. The NAN cluster information may include information such as anchor master rank, hop count to anchor master, and anchor master beacon transmission time, among other information. The availability schedules (e.g., to wait for the response from peer devices) may include information such as committed discovery windows and/or committed further availability windows, among other information. The cluster merging indication may include information such as a flag indicating whether the NAN device will or will not merge and/or a rank indicating a current constraint level for cluster merging. The device capability information may include information such as 2.4 GHz only device or dual-band device, and 802.11 high transport (HT) capable or very high transport (VHT) capable, among other information.

In some embodiments, after initiation of the fast discovery mode, a NAN device may transmit NAN probe beacons on NAN discovery channels (either, both, or alternately) with a high frequency, e.g., using a period less than 128 TU. In some embodiments, if the NAN device is in a master role or a non-master sync state, the NAN device may use NAN probe beacons to replace NAN discovery beacons and/or NAN synchronization beacons. In some embodiments, if the NAN device is in a non-master non-sync state, the NAN device may avoid transmitting NAN probe beacons within the NAN device's discovery windows or use the NAN probe beacons to replace service discovery frames it plans to transmit within the discovery windows. In some embodiments, the NAN device may gradually increase the frequency (shorten the period) of the NAN probe beacon transmissions until it discovers a peer device with desired service (e.g., from 128 TU to 64 TU to 32 TU to 16 TU or from 128 TU to 96 TU to 64 TU, etc.).

In some embodiments, if a NAN device that initiates fast discovery mode has an active datapath running on a NAN data channel, which is different from NAN discovery channels, and has to stay on the data channel for most of the time, the NAN device may use BT, BLE, or NFC to inform a peer device about its data channel. The NAN device may then transmit NAN probe beacons on the data channel while it operates on the data channel for the active datapath, and the peer device may scan the data channel to discover the NAN device. In some embodiments, if a NAN device is informed by a peer device, e.g. by using BT, BLE, or NFC, that the peer device wants to use a data channel for fast discovery, the NAN device may enter fast discovery mode and transmit NAN probe beacons on the data channel specified by the peer device.

In some embodiments, a NAN device in fast discovery mode may continuously scan one or both NAN discovery channels for an extended window (e.g. for at least 128 TU) for every discovery window (DW) interval or every few DW intervals. In some embodiments, if a NAN device has an active datapath running on a data channel and informs a peer device about the data channel by using BT, BLE, or NFC, the NAN device may scan the data channel. In addition, in some embodiments, if a NAN device is informed by a peer device to use a data channel for fast discovery, the NAN device may scan the data channel specified by the peer device. Note that if the NAN device and the peer device indicate different data channels for fast discovery, both devices may use NAN discovery channels for transmitting and scanning for NAN probe beacons. In some embodiments, once a NAN device transmits a NAN probe beacon on a channel, the NAN device may be present on the channel for an extended period (e.g. 32-64 TU) to wait for quick responses from peer device(s).

Post Discovery

In some embodiments, after a NAN device discovers a peer device in a different NAN cluster with a desired service (e.g., post discovery), the NAN device may merge with, temporarily join, or not merge with the peer device's NAN cluster. In some embodiments, the NAN device may merge with the peer device's NAN cluster and continue the service discovery in the peer device's availability windows if the NAN device has a lower cluster grade and/or the NAN device is able to merge with the peer device's NAN cluster (e.g., the NAN device has less constraints than the peer device for NAN cluster merging). In some embodiments, the NAN device may temporarily join the peer device's NAN cluster while maintaining its existing NAN cluster and continue the service discovery in the peer device's availability windows and after the NAN device collects the peer device's full service information, the NAN device may determine whether to merge into the peer device's NAN cluster formally in order to set up data path for the service.

In some embodiments, if the NAN device cannot merge with the peer device's NAN cluster (e.g., due to its higher cluster grade or higher constraints for NAN cluster merging), the NAN device may be present in the peer device's availability windows and transmit a NAN probe beacon or a unicast NAN probe frame (e.g., with same information as a NAN probe beacon) to the peer device and/or initiate (enter) a fast discovery mode (if the NAN device is not currently in fast discovery mode) and transmit NAN probe beacons to the peer device. In some embodiments, the NAN device may indicate the transmitted NAN probe beacon or unicast NAN probe frame is in response to the received beacon and/or a service discovery frame from the peer device. In addition, after receipt of the NAN probe beacon/ unicast NAN probe frame, the peer device may determine to merge with or join the NAN device's cluster or terminate the discovery operation.

Note that in some embodiments, a NAN device in fast discovery mode may defer (e.g., delay) merging/joining any newly discovered NAN cluster until the NAN device discovers all peer devices within range with desired service(s). Post discovery of all peers within range with desired services, the NAN device may select a best peer device for further service discovery. In other words, the NAN device may a select a peer device in a NAN cluster that the NAN device may merge/join over a peer device in a NAN cluster that the NAN device may not be able to merge/join.

Extended Discovery

In some embodiments, a NAN device (e.g., such as client station 106) may enter (or initiate/trigger) an extended discovery mode in which the NAN device may scan NAN discovery channels (either, both, or alternately) substantially continuously for an extended period of time or an extended window (e.g., such as for at least 128 TU). The NAN device may scan the NAN discovery channels for every discovery window (DW) interval or periodically (e.g., every other or every third or fourth DW, among other periodic scan intervals). Note that in some embodiments, the NAN device may only initiate (or enter) an extended discovery mode if the NAN device is not constrained by power or other operations (e.g., coexistence operations).

In some embodiments, a NAN device in an extended discovery mode may transmit at least one NAN beacon (e.g., a synchronization, discovery, or probe beacon) within each extended window even if the NAN device is in a non-master non-sync state. In some embodiments, the NAN beacon may include the NAN device's role/state/mode information, service information, NAN cluster information, and/or subsequent extended windows. In some embodiments, if the NAN device is in a non-master role, the NAN device may transmit no more than one NAN beacon in each extended window in order to avoid too many beacon transmissions over the air from non-master devices. In some embodiments, if the NAN device is in a non-master non-sync role, the NAN device may not transmit NAN probe beacons within its discovery windows. In some embodiments, a non-master non-sync NAN device may replace planned service discovery frame transmissions within its discovery windows with NAN probe beacon transmissions.

In some embodiments, if a NAN device receives a NAN probe beacon from a non-master non-sync NAN device, but the NAN device cannot be reached by any master or non-master sync NAN device in the same NAN cluster (e.g., the NAN device cannot receive any beacon from any master or non-master sync NAN device in the same NAN cluster), the NAN device may request the non-master non-sync NAN device to continue transmitting NAN probe beacons. The NAN device may then scan for the NAN probe beacons in order to guide itself to the non-master non-sync NAN device's discovery windows and/or further availability windows for further service discovery and/or datapath setup. In some embodiments, the non-master non-sync device may change its state to non-master sync state in order to transmit NAN synchronization beacons in its discovery windows and/or it may continue transmitting NAN probe beacons in its extended windows.

EXAMPLE EMBODIMENTS

Figure 5A:
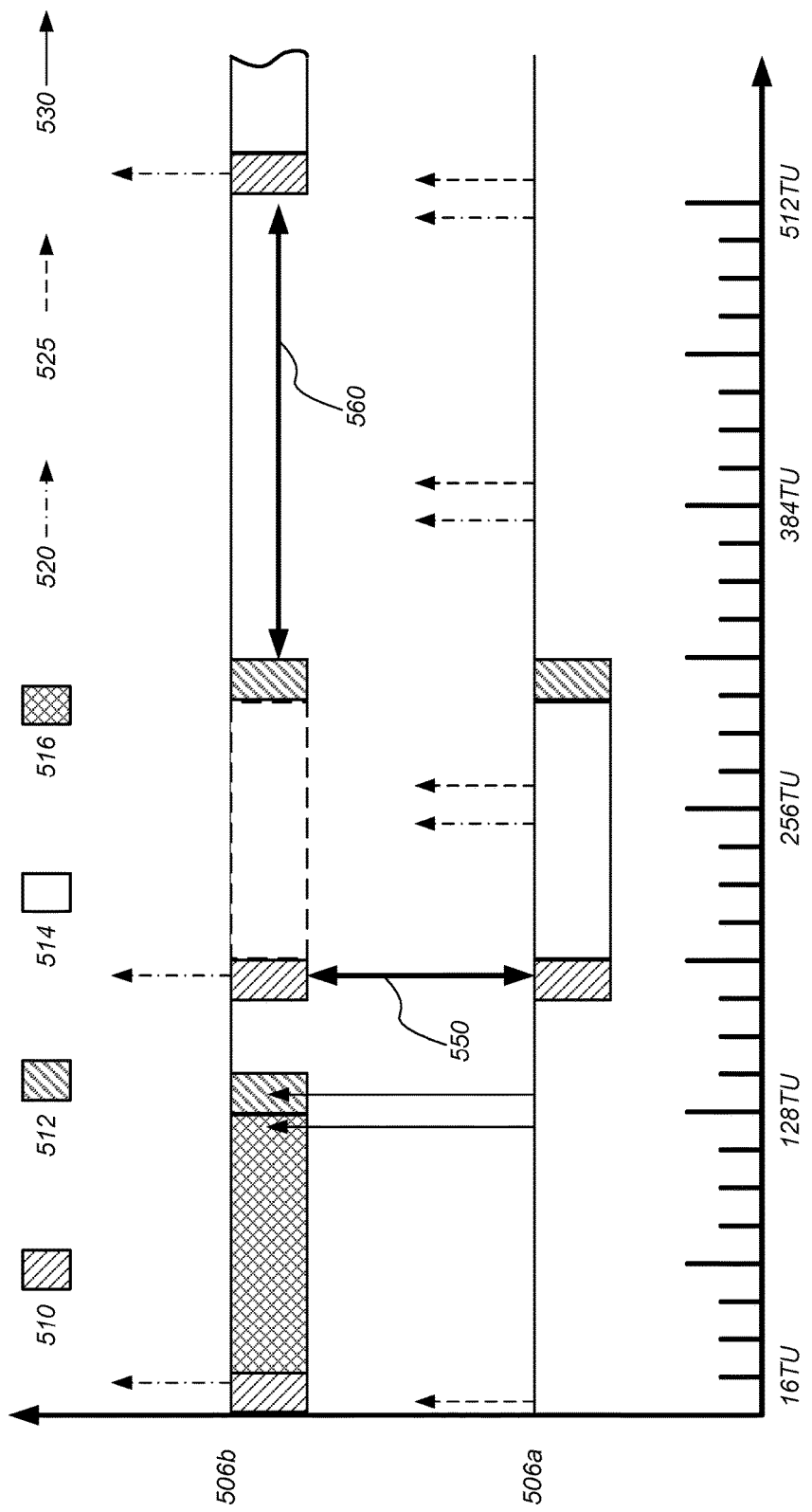
FIGS. 5A-B illustrate example signaling for peer NAN devices performing extended service discovery and fast discovery, according to some embodiments.
Figure 5B:
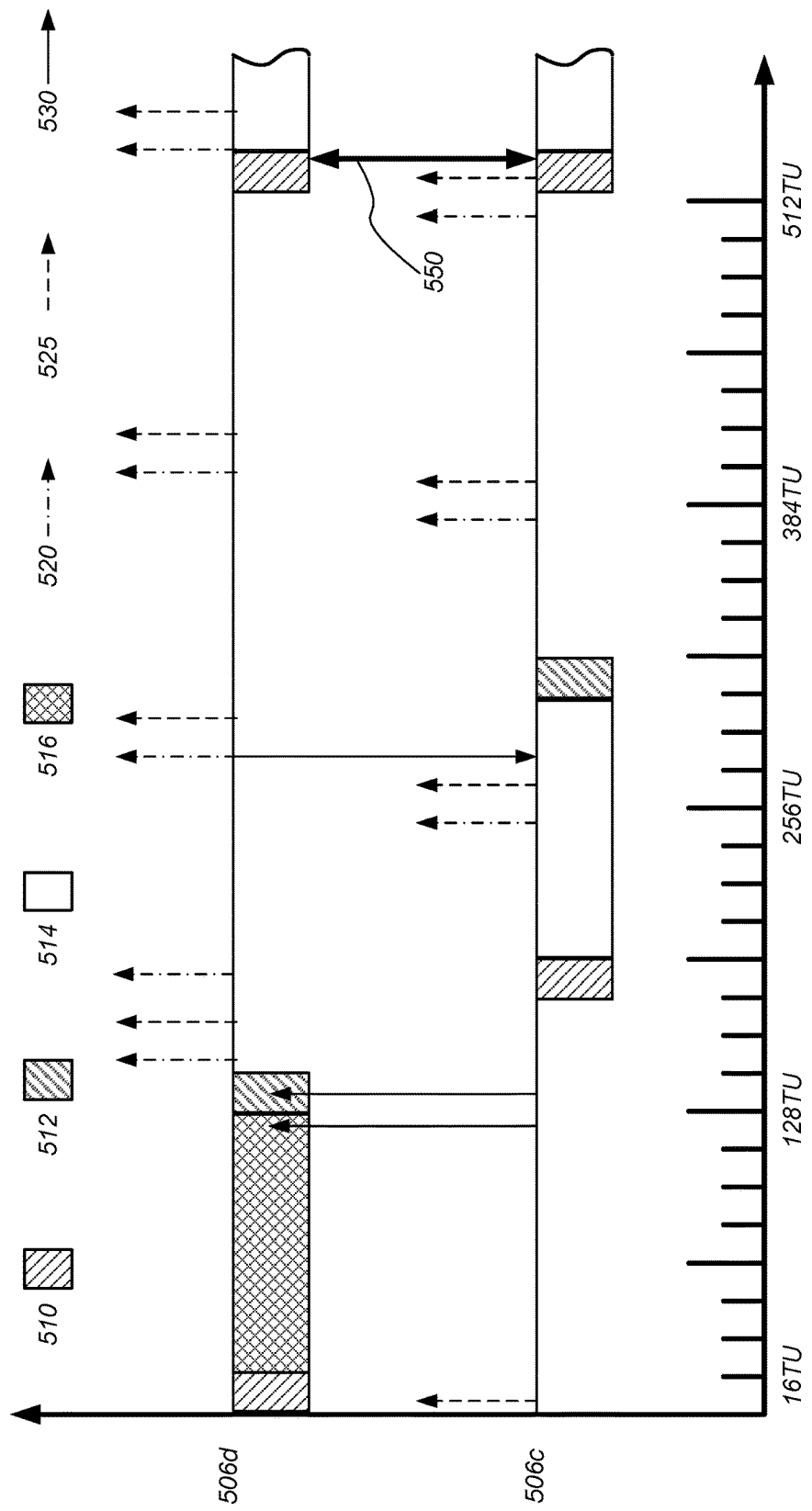

FIGS. 5A-B illustrate example signaling for peer NAN devices performing extended service discovery and fast discovery, according to some embodiments. As shown by FIG. 5A, a publisher 506b (e.g., such as client station 106) may be in an extended discovery mode (e.g., scanning period 516 occurring after discovery window 510) and may substantially continuously scan NAN channels during an extended discovery window. Note that publisher 506b may periodically transmit discovery beacons 520. In addition, a subscriber 506a (e.g., such as client station 106) may be in a fast discovery mode and may transmit NAN probe beacons 530 (as well as discovery beacons 520 and/or synchronization beacons 525) on one or more NAN channels. The publisher 506b may receive the NAN probe beacons 530 during one of its extended discovery windows 512 (e.g., via scanning of NAN channels). The publisher 506b may determine to merge (e.g., at 560) with the subscriber 506a's NAN cluster and both devices may use their discovery windows (e.g., 510 and 512) and/or further availability windows 514 for further service discovery and datapath setup, e.g., via signaling 550.

As shown by FIG. 5B, a publisher 506d (e.g., such as client station 106) may be in an extended discovery mode and may substantially continuously scan NAN channels during an extended discovery window 516. In addition, a subscriber 506C (e.g., such as client station 106) may be in a fast discovery mode and may transmit NAN probe beacons 530 on one or more NAN channels. The publisher 506d may receive the NAN probe beacons during one of its extended discovery windows 516. The publisher 506d may determine that it cannot merge or join the subscriber 506c's NAN cluster, therefore, it may also enter a fast discovery mode and start to transmit NAN probe beacons 530. The subscriber 506c may scan NAN channels aggressively and receive the NAN probe beacon from the publisher 506d. Subsequently, the subscriber 506c may merge or join the publisher's cluster to perform further service discovery, e.g., via signaling 550.

Figure 6:
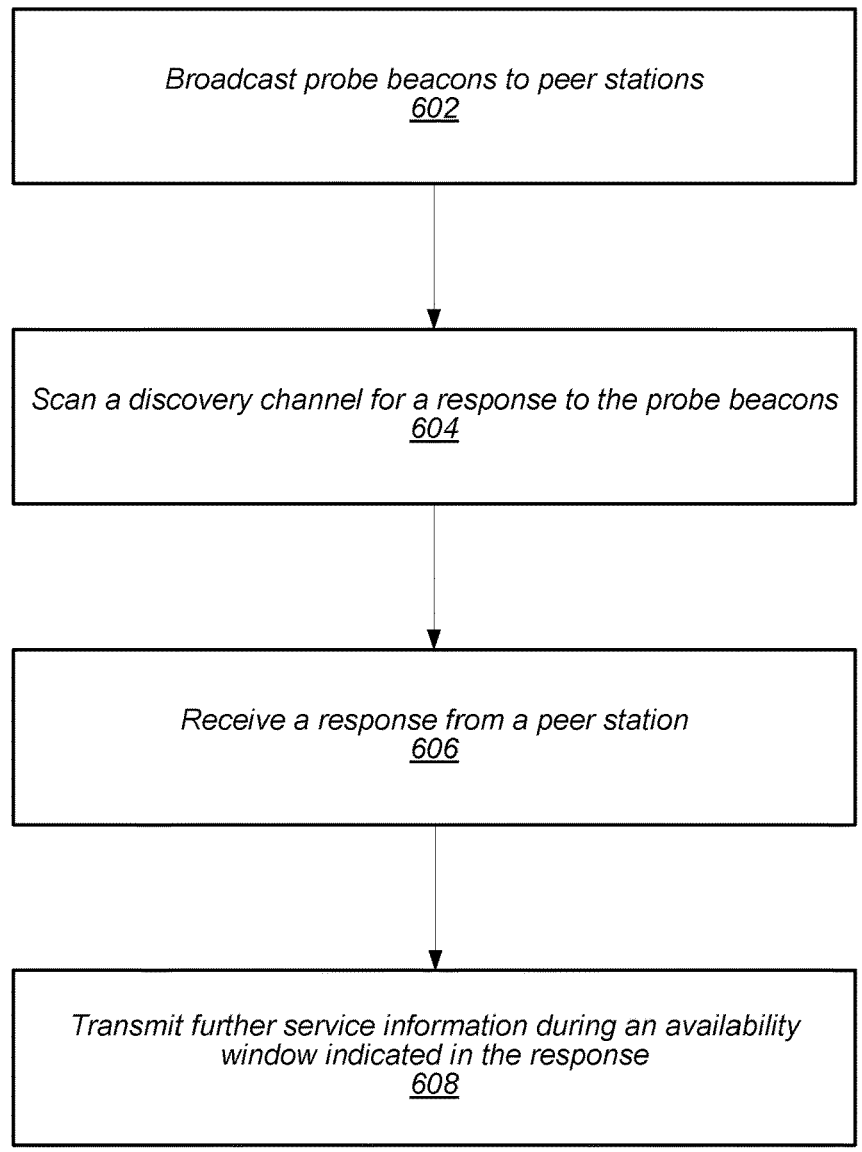
FIG. 6 illustrates a block diagram of an example of a method for accelerated service discovery, according to some embodiments.

FIG. 6 illustrates a block diagram of an example of a method for accelerated service discovery, according to some embodiments. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 602, a wireless station (or a processor of the wireless station), such as client station 106, may broadcast probe beacons, e.g., to neighboring wireless stations (or peer stations). In some embodiments, the probe beacons may be broadcast at a frequency of less than once every 128 time units. In some embodiments, the probe beacons may include any or all of a role of the wireless station, a state of the wireless station, a mode of the wireless station, a current timing synchronization function (TSF), cluster information associated with the wireless station, one or more availability schedules of the wireless station (e.g., indicating times and channel combinations the wireless station may be available for communications), a cluster merging indication, and/or capabilities of the wireless station. The device role/state/mode may indicate whether the NAN wireless station has a master/non-master role, is in a sync/non-sync state, and/or is in a fast discovery mode with or without triggering, among other information. The service information may include a list of service identifiers with publisher/subscriber indication, a service identifier hash/bloom filter, and a service descriptor attribute(s), among other information. The time/clock information may include a current timer synchronization function. The cluster information may include information such as anchor master rank, hop count to anchor master, and anchor master beacon transmission time, among other information. The availability schedules (e.g., to wait for the response from peer devices) may include information such as committed discovery windows and/or committed further availability windows, among other information. Note that availability schedules may be specified as times at which and/or channels on which the wireless station may be available for communications. Note additionally that "committed" windows/schedules may refer instances that the wireless station is required to be available for communications as opposed to non-committed windows/schedules which may refer to instances that the wireless station may be available for communications. The cluster merging indication may include information such as a flag indicating whether the wireless station will or will not merge and/or a rank indicating a current constraint level for cluster merging. The device capability information may include information such as 2.4 GHz only device or dual-band device (e.g., 2.4 GHz and 5 GHz), and 802.11 high transport (HT) capable or very high transport (VHT) capable, among other information.

In some embodiments, broadcast of probe beacons may be responsive to an event such as a service, user, or device trigger, e.g., the wireless station may receive user input selecting an application and/or service, and/or an operation such as a display activation occurs. In some embodiments, broadcast of probe beacons may be responsive to an event such as receiving a discovery request (or trigger) from a neighboring wireless station via an alternative interface such as BT, BTLE, and/or NFC. In some embodiments, broadcast of probe beacons may be periodic, e.g., in order to discover devices and/or services in a different cluster.

At 604, the wireless station may scan discovery and/or other specified channels for responses to the probe beacons. In some embodiments, the wireless station may scan discovery channels for a specified time period, e.g., the wireless station may enable a timer and may scan discovery channels until a timeout of the timer and/or until a desired device and/or service is discovered. In some embodiments, a timeout value of the timer may be longer for an explicit triggering case (e.g., a service, user, or device trigger) and may be shorter for a periodic case.

At 606, the wireless station may receive a response to one of the probe beacons from a neighboring wireless station.

At 608, the wireless station may transmit further service information to the neighboring wireless station. The further service information may be transmitted during an availability window indicated in the response to one of the probe beacons. The availability window may indicate both a time for communications (e.g., a start time and/or a duration) and/or a channel for communications. In some embodiments, to transmit the further service information, the wireless station may perform any or all of a merger to a cluster of the neighboring wireless station, a temporary joining of the cluster of the neighboring wireless station, and/or transmitting an addition probe beacon and/or a unicast probe frame to the neighboring wireless station. In some embodiments, the unicast probe frame may include any or all of a role of the wireless station, a state of the wireless station, a mode of the wireless station, a current timing synchronization function (TSF), cluster information associated with the wireless station, one or more availability schedules of the wireless station (e.g., indicating times and channel combinations the wireless station may be available for communications), a cluster merging indication, and/or capabilities of the wireless station.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio in communication with the at least one antenna and configured to perform short range communications via a Wi-Fi interface; and at least one processor in communication with the at least one radio;

wherein the at least one processor is configured to cause the wireless station to:

broadcast one or more probe beacons, wherein the one or more probe beacons comprise information indicating a capability of the wireless station and a cluster merging indication, wherein the capability comprises information indicating whether the wireless station is single or dual band capable and whether the wireless station is high transport or very high transport capable;

scan at least one discovery channel for a response to a probe beacon of the one or more probe beacons;

receive at least one response from at least one neighboring wireless station; and transmit further service information to the at least one neighboring wireless station during an availability window of the at least one neighboring wireless station, wherein the at least one response indicates the availability window.

2. The wireless station of claim 1, wherein the one or more probe beacons further comprise information indicating one or more of:
a role of the wireless station;
a state of the wireless station;
a mode of the wireless station;
a current timing synchronization function (TSF);
cluster information; or
one or more availability schedules of the wireless station.

3. The wireless station of claim 1, wherein to transmit further service information, the at least one processor is further configured to cause the wireless station to perform at least one of:
merging with a cluster of the at least one neighboring wireless station;
temporarily joining the cluster of the at least one neighboring wireless station; or
transmitting one of a probe beacon or a unicast probe frame to the at least one neighboring wireless station.

4. The wireless station of claim 1, wherein the at least one processor is configured to cause the wireless station to broadcast the one or more probe beacons in response to an event, wherein the event comprises one of a service trigger, a user trigger, a device trigger, or receipt of a discovery request from a neighboring wireless station.

5. The wireless station of claim 4, wherein the wireless station further comprises at least one non-Wi-Fi interface, wherein the at least one non-Wi-Fi interface comprises one of a Bluetooth interface, a Bluetooth Low Energy interface, or a near field communications interface; and wherein the discovery request is received via the non-Wi-Fi interface.

6. The wireless station of claim 1, wherein the wireless station further comprises at least one non-Wi-Fi interface, wherein the at least one non-Wi-Fi interface comprises one of a Bluetooth interface, a Bluetooth Low Energy interface, or a near field communications interface; and wherein, to broadcast the one or more probe beacons to at least one neighboring wireless station, the at least one processor is further configured to cause the wireless station to broadcast the one or more probe beacons to at least one neighboring wireless station via the non-Wi-Fi interface.

7. The wireless station of claim 1, wherein, to broadcast one or more probe beacons to at least one neighboring wireless station, the at least one processor is further configured to cause the wireless station to periodically broadcast a probe beacon at least once per specified time period.

8. An apparatus, comprising:

a memory; and at least one processor in communication with the memory, wherein the at least one processor is configured to:

generate instructions to periodically broadcast probe beacons in response to an occurrence of an event, wherein the probe beacons comprise an indication of a mode of a wireless device associated with the apparatus and a cluster merging indication, wherein the cluster merging indication includes information comprising a flag indicating whether the apparatus will merge to a cluster of at least one neighboring wireless station and rank indicating a current constraint level for cluster merging;

scan at least one discovery channel for a response to a probe beacon of the probe beacons; and generate instructions to transmit further service information to a peer wireless device in response to receiving a response to the probe beacon from the peer wireless device, wherein the further service information is transmitted on a channel at a specified time, wherein the channel and specified time are included in the response to the probe beacon.

9. The apparatus of claim 8, wherein the event comprises one of a service trigger, a user trigger, a device trigger, or receipt of a discovery request from a peer wireless device.

10. The apparatus of claim 8, wherein to generate instructions to transmit further service information, the at least one processor is further configured to generate instructions to:
merge with a cluster of the peer wireless device;
temporarily join the cluster of the peer wireless device; or
transmit one of a probe beacon or unicast probe frame to the peer wireless device.

11. The apparatus of claim 10, wherein the unicast probe frame comprises one or more of:
a current timing synchronization function (TSF);
an item of cluster information;
one or more availability schedules; or
a cluster merging indication.

12. The apparatus of claim 8, wherein, to generate instructions to periodically broadcast probe beacons to peer wireless devices, the at least one processor is further configured to generate instructions to periodically broadcast probe beacons to peer wireless devices via a non-Wi-Fi interface.

13. A non-transitory computer readable memory medium storing program instructions executable by a processor of a wireless station to:

generate instructions to broadcast one or more probe beacons in response to an occurrence of an event, wherein the one or more probe beacons comprise a cluster merging indication and at least one of a role, state, or mode of the wireless station, wherein the role indicates whether the wireless station is in a master role or a non-master role, wherein the state indicates whether the wireless station is in a sync state or a non-sync state, and wherein the mode indicates whether the wireless station is in a fast discovery mode with triggering or a fast discovery mode without trigger;

scan at least one discovery channel for a response to the one or more probe beacons;

receive at least one response from at least one neighboring wireless station; and generate instructions to transmit further service information to the at least one neighboring wireless station, wherein the further service information is transmitted during an availability window indicated in the at least one response.

14. The non-transitory computer readable memory medium of claim 13, wherein the one or more probe beacons comprise information indicating one or more of:
a current timing synchronization function (TSF);
cluster information;
one or more availability schedules of the wireless station; or
a capability of the wireless station.

15. The non-transitory computer readable memory medium of claim 13, wherein the event comprises one of a service trigger, a user trigger, a device trigger, or receipt of a discovery request from a peer wireless device.

16. The non-transitory computer readable memory medium of claim 13, wherein the availability window is specified by a start time and a channel.

17. The non-transitory computer readable memory medium of claim 13, wherein, the program instructions executable by a processor of a wireless station to generate instructions to broadcast one or more probe beacons to at least one neighboring wireless station, are further executable to generate instructions to broadcast the one or more probe beacons to at least one neighboring wireless station via a non-Wi-Fi interface of the wireless station, wherein the non-Wi-Fi interface comprises one of a Bluetooth interface, a Bluetooth Low Energy interface, or a near field communications interface.

18. The wireless station of claim 1, wherein the cluster merging indication includes information comprising a flag indicating whether the wireless station will merge to a cluster of the at least one neighboring wireless station and rank indicating a current constraint level for cluster merging.

19. The apparatus of claim 8, wherein the broadcast probe beacons further comprise information indicating whether a radio in communication with the apparatus is single or dual band capable and whether the radio station is high transport or very high transport capable.

20. The non-transitory computer readable memory medium of claim 13, wherein the one or more probe beacons further comprise information indicating whether the wireless station is single or dual band capable and whether the wireless station is high transport or very high transport capable.

* * * * *